United States Patent [19]
Kesselman

[11] Patent Number: 4,552,394
[45] Date of Patent: * Nov. 12, 1985

[54] TAMPER INDICATOR

[76] Inventor: David A. Kesselman, 16685 Arnold Dr., Sonoma, Calif. 95476

[*] Notice: The portion of the term of this patent subsequent to Feb. 8, 2000 has been disclaimed.

[21] Appl. No.: 550,546

[22] Filed: Nov. 10, 1983

Related U.S. Application Data

[63] Continuation of Ser. No. 434,550, Oct. 15, 1982, Pat. No. 4,426,108, which is a continuation of Ser. No. 274,483, Jun. 17, 1981, Pat. No. 4,372,593.

[51] Int. Cl.⁴ .............................................. B65D 55/02
[52] U.S. Cl. ................................................. 292/307 B
[58] Field of Search ...................... 285/45, 80, DIG. 2, 285/DIG. 22; 137/361, 384; 174/92; 339/37, 39, 80, 82, 208; 292/307 R, 307 B, 318, 327; 411/371, 373, 429, 539, 540, 548, 910; 70/231, 232

[56] References Cited

U.S. PATENT DOCUMENTS

| 1,154,960 | 9/1915 | Baruch | 292/307 B |
|---|---|---|---|
| 1,361,615 | 12/1920 | Reesman | 292/307 B |
| 1,626,273 | 4/1927 | Dietze | 292/318 X |
| 1,678,955 | 7/1928 | Rockenbauer | 292/307 B |
| 1,814,412 | 7/1931 | Rutten | 292/307 B |
| 1,870,040 | 8/1932 | Dietze | 292/307 B |
| 1,909,203 | 5/1933 | Macklin et al. | 292/307 R X |
| 1,944,195 | 1/1934 | Salisbury | 292/307 R |
| 3,311,396 | 3/1967 | Hotchkiss et al. | 292/307 R |
| 3,380,267 | 4/1968 | Winchester | 292/307 R X |
| 3,757,031 | 9/1973 | Izraeli | 174/92 X |
| 3,858,162 | 12/1974 | Mai et al. | 339/208 X |
| 4,219,693 | 8/1980 | French | 174/92 X |
| 4,286,640 | 9/1981 | Knox et al. | 292/307 B X |
| 4,326,740 | 4/1982 | Guiler | 292/307 B |
| 4,405,161 | 9/1983 | Young et al. | 70/232 X |

FOREIGN PATENT DOCUMENTS

| 2014680 | 8/1979 | United Kingdom . |
|---|---|---|
| 1564237 | 4/1980 | United Kingdom . |

Primary Examiner—Robert L. Wolfe
Assistant Examiner—Russell W. Illich
Attorney, Agent, or Firm—Sixbey, Friedman & Leedom

[57] ABSTRACT

A tamper indicator includes a collar which can be positioned to be circumambient a connection nut on a gas meter. The collar includes two portions which are interlocked by snap-catches which are located inside a locked collar. The collar portions are formed of frangible material and can include lines of weakening. Once in place, the collar cannot be removed without breaking it, and once broken cannot be repaired so that an indication is provided that the encircled connection nut may have been tampered with.

18 Claims, 10 Drawing Figures

TAMPER INDICATOR

This is a continuation of patent application Ser. No. 434,550, filed Oct. 15, 1982, now U.S. Pat. No. 4,426,108, which was a continuation of patent application Ser. No. 274,483, filed June 17, 1981, now U.S. Pat. No. 4,372,593 issued on Feb. 8, 1983.

BACKGROUND OF THE INVENTION

The present invention relates, in general, to indicating means, and, more particularly, to means for indicating that a connection nut may have been tampered with.

Tampering with gas meters is a continuing and growing problem facing gas utilities.

This tampering includes tampering with index boxes and hand-hold plates to gain entry into the internal workings of the gas meters. However, tamper-resistant fasteners, such as the fastener disclosed in U.S. Pat. No. 4,037,515, have satisfactorily dealt with this index box tampering problem.

The afore-mentioned solution has forced the would-be tamperer to move to the gas meter connection nut to bypass the gas meter completely. This is accomplished by disconnecting the connection nut and "dropping the meter". A bypass pipe is connected and causes gas flow to bypass the meter, and thus to provide gas with no charge being made.

Millions of dollars in revenue is being lost by gas companies in the United States due to this meter bypassing type of tampering.

The only method presently available to gas companies is to seal off the connection lock nut completely with hardened steel collars and barrel locks. This method is cost prohibitive.

Devices such as the indicating means disclosed in U.S. Pat. No. 3,311,396 are not effective because there is easy access to the locking mechanism of the protective device itself. Part of this protective device locking mechanism are exposed so the would-be tamperer can, by jimmying, release the protective device without leaving an indication of tampering. While such jimmying is not easy, the present cost of fuel may make the effort worthwhile to such a thief. Thus, the exterior location of the device locking means makes it possible to defeat this indicating device.

Thus, there is need for a cost effective, defeat proof means to alert a gas company of attempted theft. Once theft is detected, the hardened steel devices can be attached.

SUMMARY OF THE INVENTION

The device embodying the teachings of the present invention provides a cost-effective defeat-proof means for indicating that a connection nut may have been tampered with.

The device is preferably used to encircle a connection nut on a gas meter, and can be manufactured by injection molding processes. Preferably, the device is formed of plexiglas and/or styrene resin, or other brittle, frangible material. However, it is here noted that the device of the present invention can be used in conjunction with fastening and joining means other than gas meters as well, and the gas meter is only a preferred element, but is not intended as a limitation.

The device includes a collar comprising two arcuate portions, each of which forms a part of a cirle, and each of which has a male fastener on one end thereof and a female fastener on the other end thereof. The fasteners are positioned on an inner surface of each arcuate portion to be located completely inside the collar when that collar is assembled. The collar portions also may have scorelines thereon to provide areas of weakening which will easily break if the collar is stressed slightly. A non-removable label can also be placed on the collar to cover the joint between the two arcuate portions.

The collar is formed of frangible material which is easily broken, and, once broken, cannot be reassembled without leaving some indication that a break has occurred.

The connection nut seal is fixed accordingly to fit various sizes of connection nuts, such as 5LT, 10LT, 20LT, and the like.

Thus, the device disclosed herein has the following features:

Styrene or plexiglas will clearly denote any tampering. As well, due to its brittle nature, it will break/crack when stressed.

The special grooves cut in one embodiment completely surround the circumference, bottom and top, preferably at ¼ inch intervals, thereby thinning the wall and causing the wall to break at designated areas when stressed. These thin areas will fail before the lock, and, as such, allow easier observation of tampering. As well, these grooves prevent the tamperer from applying clear tape to bind broken pieces undetected. The preferred material is selected such that gluing is easily detected.

The device herein disclosed is designed: (a) to prevent tampering; (b) to provide a quick-snap type lock requiring no special tools; (c) to be non-removable without destruction; (d) to have the wall areas fail before the lock when stressed; (e) to permit the use of brittle plastics without breaking during installation.

The preferred form of the device has parts which are in a relationship which permits manufacture of only one-half of the overall device being required. By inverting the halves, they fit together and lock securely.

The snap lock features a unique 10° reverse lip to lock more securely. The wall thickness is sufficient to permit the collar portions to flex and have the locks thereof engaged. The benefit of two flexible sides permits flex and lock without premature failure. A tamper-proof shield is incorporated into the design to cover the snap lock section to prevent tampering with the snap lock. The shield also aids in insertion and helps align both halves during installation.

The ribbed design also permits heat stamping of identification numbers, names, part numbers, and the like, as well as color coding.

Use of low cost injection molded materials produces a cost-effective product.

OBJECTS OF THE INVENTION

It is a main object of the present invention to provide a defeat-proof, cost-effective means of indicating tampering with a fastener.

It is yet another object of the present invention to provide a defeat-proof, cost-effective means of indicating tampering with a connection nut on a gas meter.

It is yet another object of the present invention to provide a tampering indicator which once indicating tampering, cannot be reset.

These together with other objects and advantages which will become subsequently apparent reside in the details of construction and operation as more fully hereinafter described and claimed, reference being had to

DETAILED DESCRIPTION OF THE INVENTION

Figure 1:
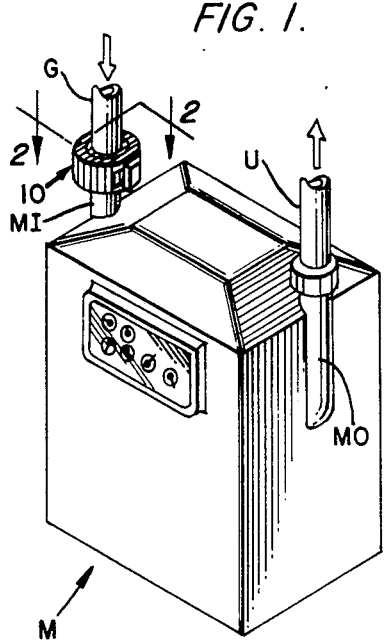
FIG. 1 is a perspective of a gas meter having a tamper indicator on a locking nut in accordance with the teachings of the present invention.
Figure 2:
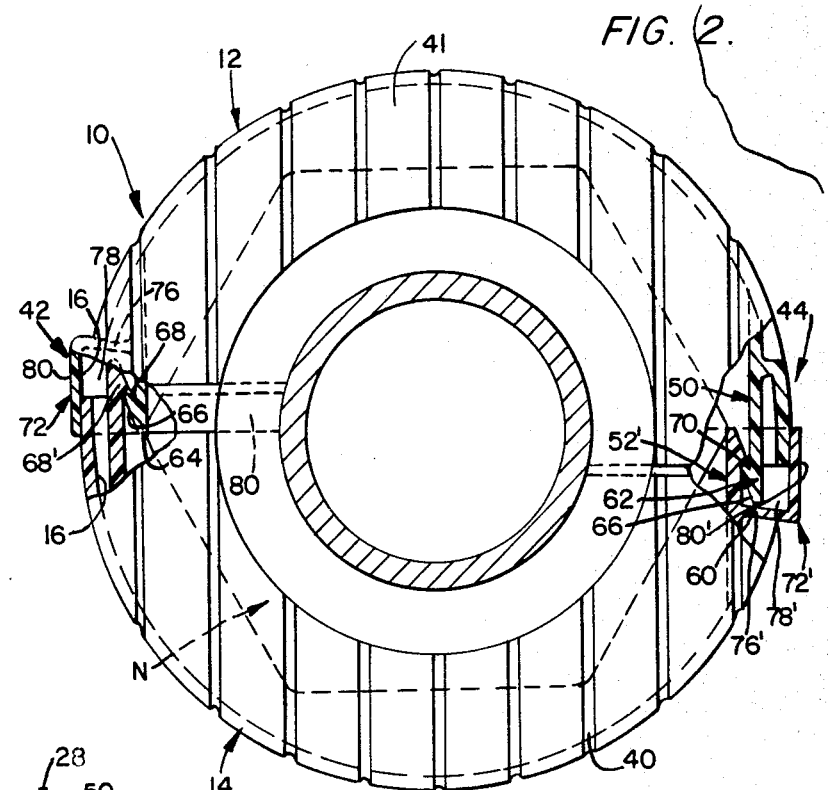
FIG. 2 is a view taken along line 2—2 of FIG. 1.
Figure 3:
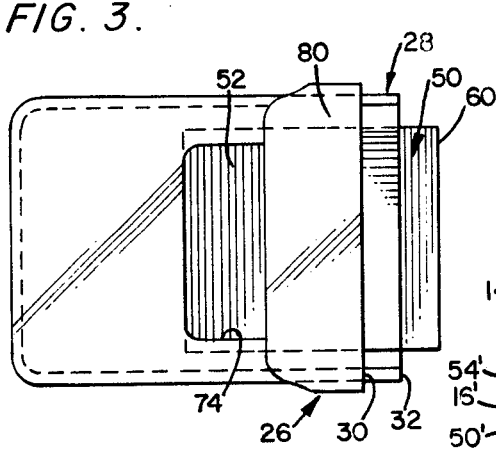
FIG. 3 is a view of an end of one portion of a collar embodying the teachings of the present invention.

Shown in FIG. 1 is a gas meter M having an inlet line MI and an outlet line MO. The inlet line MI is coupled to a source line G by a coupling nut N (see FIG. 2), and the outlet line MO is connected to a use line U. To prevent undetected tampering with the source line, an escutcheon or collar 10 is placed around the nut N to form a barrier about the nut, as best shown in FIG. 2.

The collar encircles the nut and prevents undetected access to that nut by being removable from the nut only by breaking that collar. Once broken, the collar cannot be repaired to return same to the pre-breaking appearance. Furthermore, the collar is formed of a brittle, frangible material which is easily broken to discourage a potential tamperer from "testing" the collar to determine how effective it is.

Figure 5:
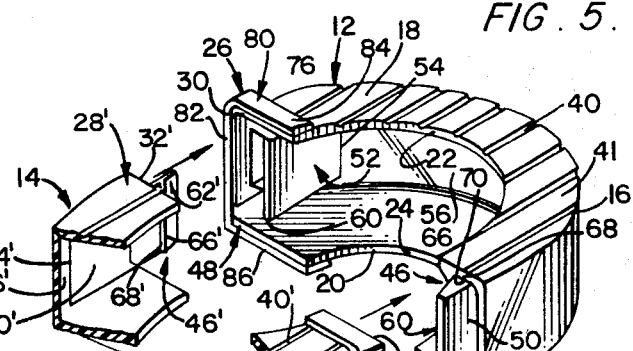
FIG. 5 is a cutaway exploded perspective of a collar embodying the teachings of the present invention.

The collar is formed of two arcuate portions 12 and 14 which may or may not be equal in circumferential extent, but are otherwise identical in the important aspects thereof. Preferably, the portions are identical in all aspects thereof, and thus each forms a 180° segment of a circle for ease of manufacturing, and therefore, only portion 12 will be described, with portion 14 having corresponding elements indicated by a prime notation. As shown in FIG. 5, the collar portions are equal in circumferential extent, but as will occur to those skilled in the art based upon the disclosure herein, the collar portions can have any suitable relative circumferential extent without departing from the scope of the present invention.

As shown in FIG. 5, the collar portion 12 includes an arcuate wall 16 to which is integrally attached a planar leg which, in the FIG. 5 orientation, forms top 18, and a planar leg, which in the FIG. 5 orientation, forms bottom 20, with the top and bottom being in spaced parallelism with each other. The top has an arcuate cutout 22 defined therein and the bottom has an arcuate cutout 24 defined therein. As shown in FIG. 5, cutout 22 has a larger diameter than does cutout 24 so the collar 10 snugly engages line MI downstream of the nut N via cutout 24, while loosely surrounding the line G upstream of the nut N via cutout 22.

As shown in FIGS. 2 and 5, each collar portion has end portions 26, 26' and 28, 28' which terminate in rims 30, 30' and 32, 32', respectively.

As shown in FIGS. 2 and 5, the rims 30, 30' and 32, 32' are not colinear with each other, but rims 30, 30' are offset from rims 32, 32'. One of the rims of each collar portion is thus offset from the diameter of the collar.

Grooves 40 are defined in the top and bottom of the collar portions by scorelines which preferably are parallel and which are separated by lands 41. The scorelines form lines of weakening in the collar to provide easy breaking thereof at such locations by a potential tamperer. Such easy breaking of the collar discourages such a potential temperer from "testing" the collar to see how much stress it can take.

The collar portions are interlocked by snap catches 42 and 44 on the collar end portions. As is shown in FIGS. 2 and 5, each collar portion has a male portion 46, 46' on one end thereof and a female portion 48, 48' on the other end thereof so that each snap catch includes one of the female portions and one of the male portions. The snap catches 42 and 44 further include tongues 50, 50' and 52, 52', respectively, which are each integrally affixed at one end 54 thereof to inner surface 56 of the wall 16. The tongues are associated with the collar ends 28, 28' and 26, 26', respectively, and each tongue extends along a secant in a manner so that the tongues are parallel with each other. The tongues are elongate and each has an outer free end 60 having a triangular denticle 62 thereon. The denticle has an apex 64 which forms the leading edge of the tongue and has a leg which forms a ramp 66 extending from the apex 64 inwardly of the collar to an inner apex 70 from which a leg 68 extends back to the inner surface of the tongue. The triangular denticle is preferably an oblique triangle with leg 68 angling from apex 70 forward toward apex 64. The preferred angle between leg 68 and the ramp 66 is acute, and, more specifically, is about 10°. The angular relationship between the legs 66 and 68 provides a secure lock when the snap catches are engaged, as well be apparent from the ensuing discussion.

The tongue 52 has end 60 thereof located to be essentially coplanar with rim 30, and the tongue 50 extends beyond the rim 32 so that the denticle of tongue 50 is located to be beyond the rim 32. The leg 68 on tongue 50 thus forms a spur which acts as a detent for a corresponding leg 68' of tongue 52' of the collar portion 14. The position of the denticle on tongue 50 relative to the rim 32 and the position of the denticle on the tongue 52 relative to rim 30 thus permits the tongue 50 of collar portion 12 to extend into end 26' of the collar portion 14 to engage the tongue 52' thereof. The interlocked contact between legs 68 and 68' is best shown in FIG. 2. The wall 16 of collar portion 12 captures the wall 16' of portion 14 to form a snap joint at each end of the collar portions. Z-shaped portions 72, 72' of the female portion of the snap joints are formed by stamping recesses 74, 74' in the walls of the collar portions to form walls 76, 76'. Z-shaped portions 72 and 72' combine with the tongues 50 and 52, respectively, to form pockets 78 and 78' which capture the corresponding tongue and end portion of the other collar portion. The pockets are sized to bias against the captured elements so that once locked together, the tongue elements of the collar portions are biased into locking engagement with each other.

Figure 4:
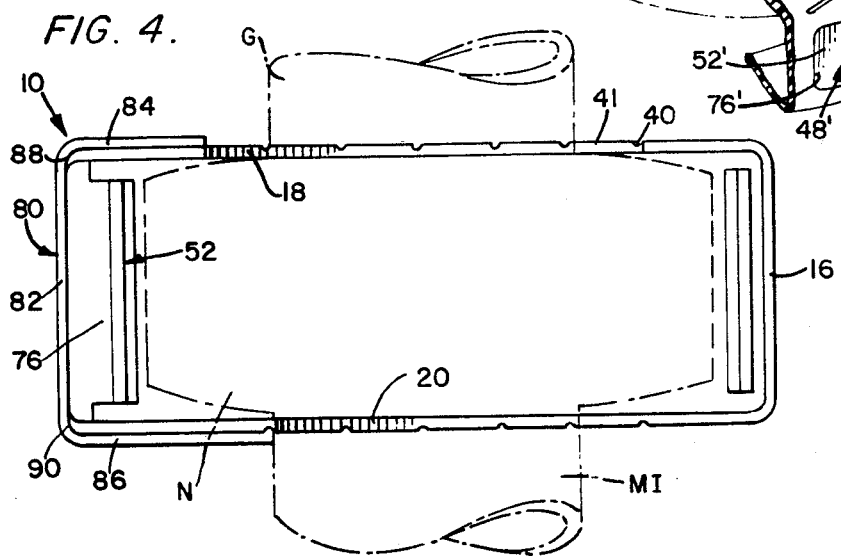
FIG. 4 is a cutaway view of a collar encircling the connection but in accordance with the teachings of the present invention.
Figure 6:
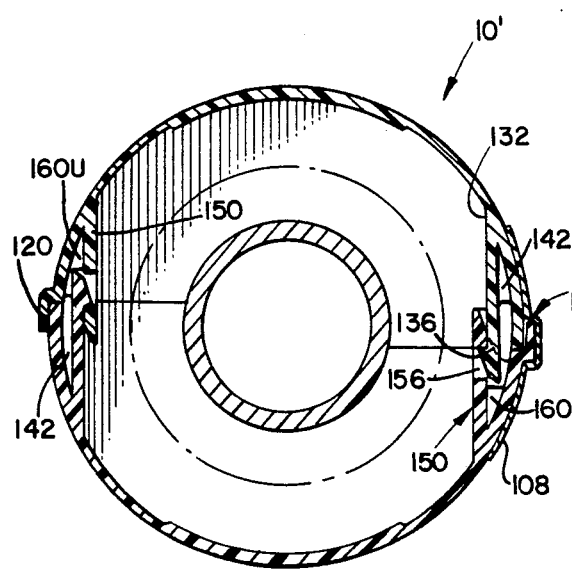
FIG. 6 is a top plan view of an alternative form of the device embodying the teachings of the present invention.

Reinforcing cuffs 80, 80' surround each interlocked collar end on three sides of that collar to reinforce the mating engagement of those ends. Thus, as best shown in FIG. 4, the cuff is U-shaped and includes a web 82 and legs 84 and 86 connected thereto. The top 18 and the bottom 20 have bevelled rims 88 and 90, respectively, and the cuff has the web 82 which spans the distance between the top and the bottom of the collar.

The tongues are flexible so that upon engagement of the collar portions, the tongues will deflect to permit one ramp 66 to slide over a corresponding ramp 66' until the legs 68 and 68' are juxtaposed. When justapositioning occurs, these legs snap into the locked position shown in FIG. 2 with the reverse angles of the legs 68 and 68' further securing that interlocked relationship.

As shown in FIG. 2, the tongue 50 and the wall 16 of the collar portion 12 acts as a male portion of the snap catch to be captured by the female portion thereof which includes the tongue 52' and wall 16' of the collar portion 14 in an inwardly biasing manner to enhance the locking feature of the collar. The nut N is thus captured in situ and encircled by the collar 10 which can be removed only by breaking that collar. The engaged legs 68 and 68' are not accessible from outside the collar, and thus once locked in the FIG. 2 position, securely and permanently (relative to the collar) lock the collar portions together.

Shown in FIGS. 6–10 is an alternative embodiment of the collar 10, denoted as collar 10'. Collar 10' is similar to the collar 10, except that top and bottom surfaces 100 and 102, respectively, of collar 10' are essentially smooth, that is, grooves 40 and lands 41 are not present in collar 10'. Furthermore, the collar 10' includes a locking mechanism which is stronger than that of collar 10 and a non-removable label 108 covering the joint 110 formed by abutting rims 114 and 116 and cuff 120.

Figure 7:
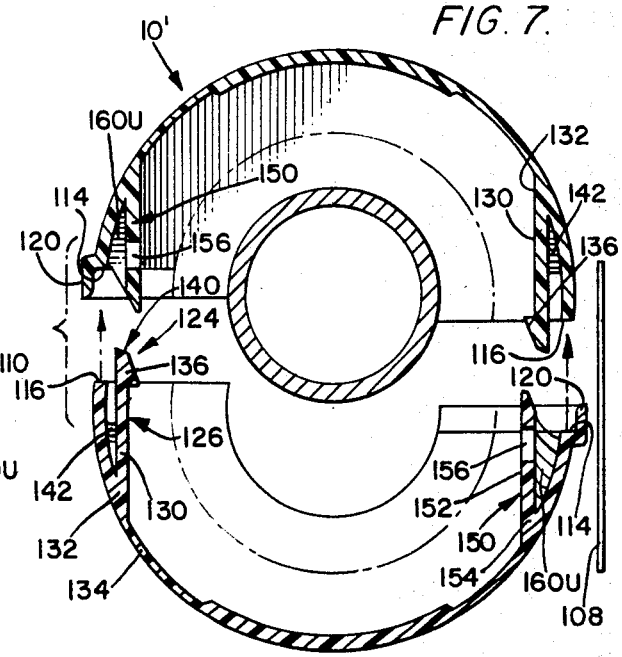
FIG. 7 is an exploded top plan view of the FIG. 6 device.
Figure 8:
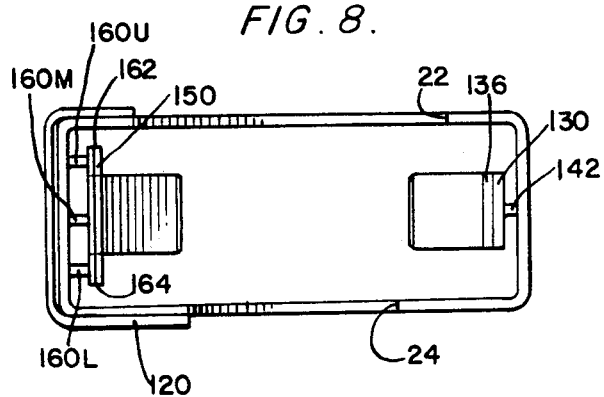
FIG. 8 is an elevation view of the FIG. 6 device.
Figure 9:
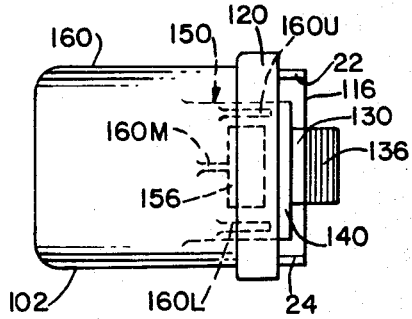
FIG. 9 is an elevation view of the FIG. 6 device.
Figure 10:
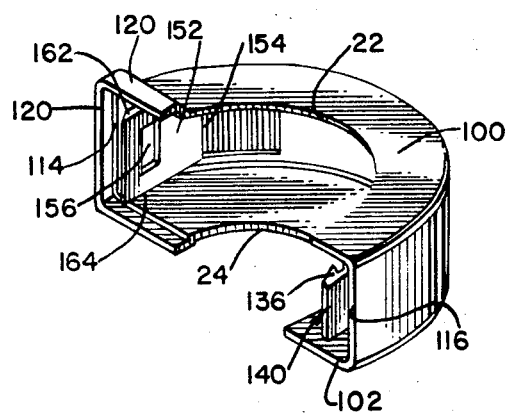
FIG. 10 is a perspective of one arcuate portion of the FIG. 6 device.

As best shown in FIG. 7, the locking mechanism of collar 10' includes snap catches 124 which each includes a male fastening element 126 having an elongate body 130 attached at one end 132 thereof to the body 134 of an arcuate portion and extending along a secant outwardly beyond rim 116. A denticle 136 is located on free end 140 of the body. A reinforcing rib 142 further attaches the body 130 to the arcuate collar portion at a location spaced from end 134. The rib 142 further strengthens the locking mechanism of collar 10'.

Each of the snap catches 124 further includes a female fastening element 154 having an elongate body 152 attached at one end 154 thereof to an arcuate portion and extending along a secant of that arcuate portion to be essentially parallel with the male fastening element body.

A slot 156 is defined in the body 152 to be positioned to receive the denticle 136 in locking engagement to assemble the collar 10'. Reinforcing ribs 160U, 160M and 160L further attach the body 152 to the arcuate portion. In the preferred form of collar 10', rib 160U is located adjacent edge 162 of the body 152 and rib 160L is located adjacent the edge 164 of the body with both ribs being located between the slot and the respective edges. The preferred form of collar 10' includes a further rib 160M attaching the body to the arcuate portion and located between the slot 156 and end 154 of that body.

The snap catches on collar 10' operate in a manner similar to those of collar 10, and thus such operation will not be further described. Those skilled in the art will be able to ascertain the differences in operation between the catches on collar 10' and the collar 10.

The label 108 will contain identification indicia, and the like, to permit control to be exercised over the collar and connection nuts. The label, once torn, cannot be reconstructed. Thus, the label obviates the possibility of replacing a broken half of a collar to create a new seal. The label can be numbered consecutively if so desired. Thus, an installer can place the label, or tape, on the meter seal after snapping both arcuate halves together. The installer then records the number, date, location, and any other suitable control information on a "read" card for that particular meter installation. The label 108 can be used with collar 10 as well.

Collar 10' does not include grooves because grooves may tend to permit flexing instead of breaking for the collar. The walls of the collar 10' are substantially more brittle and frangible than the walls of collar 10.

The ribs on collar 10' reinforce the locking means of this collar so that the wall sections will break under stress before either of the locks. This feature enhances the appearance of visible signs of tampering.

The walls of collar 10' are opaque to produce readily visible signs of gluing as the finish of the collar 10' is such that glue will turn that finish dull or chalky. The material of these walls is also selected so that coloring makes them more brittle and frangible. Furthermore, opaque walls prevent viewing of the locking mechanism. Thus, a would-be tamperer is prevented from determining the type of locking mechanism he faces.

As this invention may be embedded in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A seal for providing an indication of tampering with a connection nut enclosed thereby comprising:

first and second separate, interlockable collar portions for forming a collar for surrounding a connection nut, each of said first and second collar portions including an outer wall having an inner and an outer surface, first and second walls formed integrally with said outer wall and extending in spaced relationship therefrom, said first and second walls each terminating at an inner edge, the inner edges of the first and second walls of said first collar portion cooperating with the inner edges of the first and second walls respectively of said second collar portion to define enclosed openings in said collar when said first and second collar portions are interlocked, said outer wall and first and second walls terminating at first and second spaced end edges located respectively at opposite ends of a collar portion, the first end edge of each of said first and second collar portions being positioned adjacent to the second end edge of the other collar portion when the first and second collar portions are interlocked, a cuff located adjacent the second end edge and being formed integrally with said outer and first and second walls to extend around and outwardly of said second end edge, said cuff extending from said outer and first and second walls beyond said second end edge in substantially parallel relationship for a distance such that the cuff will extend over the first and second end edges of said first and second collar portions when the first and second collar portions are interlocked, and first and second fastening means on each of said first and second collar portions with the first fastening means of each collar portion being adapted to engage and interlock with the second fastening means of the remaining collar portion at a location spaced inwardly from the first and second walls and the inner surface of the outer walls of said first and second collar portions, said first fastening means including a first member having a base portion joined to the inner surface of said outer wall at a location spaced substantially inwardly from said first end edge, said first member having a free end opposite to said base portion thereof which is spaced inwardly from the inner surface of said outer wall and which extends to and terminates at a terminal edge spaced outwardly beyond the plane of said first end edge, the first member being spaced from the inner surface of said outer wall from the point of joinder of the base portion thereof with the outer wall to the free end thereof, the free end of said first member being provided with a first catch means on the portion thereof which extends outwardly beyond the plane of said first end edge, and said second fastening means including a second member affixed at a base end thereof to the inner surface of said outer wall at a location spaced substantially inwardly from said second end edge, said second member having a free end opposite to said base end thereof which is spaced inwardly from the inner surface of said outer wall and which extends to and terminates at a terminal edge spaced outwardly beyond the plane of said second end edge but positioned within the confines of said cuff, the second member being spaced from the inner surface of said outer wall from the point of joinder of the base portion thereof with the outer wall to the free end thereof, the free end of said second member being provided with a second catch means for engaging and interlocking with the first catch means of an adjoining collar portion when said first and second collar portions are interlocked, the free end of one of said first and second members being spaced from the inner surface of said outer wall a greater distance than the free end of the remaining member, said first and second collar portions each including at least one first reinforcing rib formed to extend between a wall of the respective first and second collar portion and said first member across a space therebetween, and at least one second reinforcing rib formed to extend between a wall of the respective first and second collar portion and said second member across a space therebetween.

2. The seal of claim 1 wherein the inner surface of the outer wall of said first and second collar portions is arcuate in configuration, the first and second members of said first and second fastening means each including a member outer face extending in spaced relationship to the inner surface of said outer wall from a first line of joinder with said inner surface to said terminal edge and a member inner face extending from a second line of joinder with the inner surface of said outer wall, said second light of joinder being spaced a greater distance from said first end edge and from said terminal edge than is said first line of joinder, said base portion extending between said first and second lines of joinder and combining with said outer wall to form a first area of enlarged cross section adjacent said first line of joinder and diminishing to a second area of much smaller cross section than said first area adjacent to said second line of joinder.

3. The seal of claim 2 wherein said first catch means includes a ledge forming leg extending outwardly from the inner face of said first member at a location spaced from the terminal edge of the free end thereof and an inclined ramp positioned between said ledge forming leg and the terminal edge of the free end of said first member, said inclined ramp being formed to angle outwardly away from said terminal edge toward said ledge forming leg, the free end of said second member being spaced from the inner surface of said outer wall and from said cuff for a distance sufficient to permit the free end of said first member and said first catch means to be inserted therebetween.

4. The seal of claim 3 wherein said first catch means is positioned on said first member outwardly of the first end surface thereof and the confines of said collar portion.

5. The seal of claim 1 wherein at least one of said first and second walls of said first and second collar portions includes a weakened area which is adapted to break in response to pressure before the remainder of said collar portion.

6. The seal of claim 5 wherein said weakened area extends substantially along the extent of the inner edge of the wall of said collar portion which includes said weakened area.

7. A means for indicating tampering with a connection nut comprising:

a circular collar for surrounding and accommodating the connection nut therewithin, said collar being formed of frangible material and including a pair of interlocked collar portions;

each of said collar portions being arcuate in circumferential shape to form a portion of a circle and including a first end having a first end edge and a second end having a second end edge with a first end edge of one collar portion abutting a second end edge of another collar portion to form an essentially continuous, closed periphery about the connection nut, each collar portion further including a first fastening means on said first end and a second fastening means on said second end, said first fastening means including a first member affixed at one end thereof to an inner surface of said collar portion and having another end thereof being free and spaced inwardly of said collar portion inner surface, said first member having an inner face and an outer face located adjacent to said collar portion inner surface and interposed between said inner face and said collar portion inner surface, said end being spaced from said collar portion first end to be located outside of said collar portion and having mating means thereon, said mating means including a first ramp angled with respect to said collar inner surface and a ledge forming leg connecting said ramp to said first member inner face, said leg being angled with respect to said ramp and to said first member inner face and intersecting said inner face at an angle with respect to said inner face to form a first catch, said second fastening means including a second member affixed at one end thereof to an inner surface of said collar portion and having another end thereof being free and spaced inwardly of said collar portion inner surface, said second member having an inner face and an outer face located adjacent to said collar portion inner surface and interposed between said inner face and said collar portion inner surface, said free end being spaced from said collar portion second end to be located outside of said collar portion and having mating means thereon, said mating means including a ramp defined in said second fastening means second member outer surface and angled with respect to said collar inner surface and a ledge forming leg forming a second catch, said first and second catches mating with each other when said collar portions are interlocked, said ramps being angled and located to cause at least one of first and second members to flex when a ramp on said first fastening means of one collar portion is in contact with a ramp on a second fastening means of another collar portion during interlocking of said collar portions, said fastening means being located completely within the periphery of said collar whereby access thereto from outside said collar is prevented;
  a cuff surrounding said collar portion second end on at least three sides thereof, said cuff being L-shaped and having a first leg attached to an outer surface of said collar portion adjacent to said collar portion second end edge and extending outwardly from said outer surface, said cuff having a second leg attached to said first leg at a location spaced outwardly from said collar portion outer surface and extending forwardly of the end edge of said collar portion second end so that said cuff is raised from said collar portion outer surface, the inner connecting surfaces between said cuff and said collar portion defining said second edge and being in the form of shoulder means on each of said three sides which extend at substantially right angles to the inner and outer surfaces of said collar portion, and said first end edge of said collar portion defining a rim which also extends at essentially right angles to the inner and outer surfaces of said collar portion, a cuff on one collar portion extending over the first end of a second collar portion to cover said abutted first and second end edges with said shoulder means and said rim being juxtaposed;
  at least one reinforcing rib attaching each of said first and second members to said collar inner surface at a location spaced from said member one end; weakening means on each collar portion which make the collar susceptible to breaking when removal from a connection nut is attempted; and
  the first and second members of said first and second fastening means being positioned on said collar portions to bias said fastening means into locking engagement when said collar portions are interlocked.

8. A means for indicating tampering with a connection nut comprising:
  a circular collar for surrounding and accommodating the connection nut therewithin, said collar being formed of frangible material and including a pair of interlocked collar portions;
  each of said collar portions being arcuate in circumferential shape to form a portion of a circle and including a first end having a first end edge and a second end edge with a first end edge of one collar portion abutting a second end edge of another collar portion to form an essentially continuous, closed periphery about the connection nut, each collar portion further including a first fastening means on said first end and a second fastening means on said second end, said first fastening means including a first member affixed at one end thereof to an inner surface of said collar portion and having another end thereof being free and spaced inwardly of said collar portion inner surface, said first member having an inner face and an outer face located adjacent to said collar portion inner surface and interposed between said inner face and said collar portion inner surface, said free end being spaced from said collar portion first end to be located outside of said collar portion and having mating means thereon, said mating means including a first ramp angled with respect to said collar inner surface and a ledge forming leg connecting said ramp to said first member inner face, said leg being angled with respect to said ramp and to said first member inner face and intersecting said inner face at an angle with respect to said inner face to form a first catch, said second fastening means including a second member affixed at one end thereof to an inner surface of said collar portion and having another end thereof being free and spaced inwardly of said collar portion inner surface, said second member having an inner face and an outer face located adjacent to said collar portion inner surface and interposed between said inner face and said collar portion inner surface, said free end being spaced from said collar portion one end and having mating means thereon, said mating means including a ramp angled with respect to said collar inner surface and a ledge forming a second catch, said first and second catches mating with each other when said collar portions are interlocked, said ramps being angled and located to cause at least one of said first and second members to flex when a ramp on said first fastening means of one collar portion is in contact with a ramp on a second fastening means of another collar portion during interlocking of said collar portions, said fastening means being located completely within the periphery of said collar whereby access thereto from outside said collar is prevented;
  a cuff surrounding one of said collar portion ends on at least three sides thereof said cuff being L-shaped and having a first leg attached to an outer surface of said collar portion adjacent to a collar portion end edge associated with said one collar portion end and extending outwardly from said outer surface, said cuff having a second leg attached to said first leg at a location spaced outwardly from said collar portion outer surface and extending forwardly of the end edge associated with said one collar portion end so that said cuff is raised from said collar portion outer surface, the inner connecting surfaces between said cuff and said collar portion defining said second end edge and being in the form of shoulder means on each of said three sides which extend at substantially right angles to the inner and outer surface of said collar portion, and said first end edge of said collar portion defining a rim which also extends at essentially right angles to the inner and outer surfaces of said collar portion, a cuff surrounding one end of said one collar portion extending over an opposite end of said another collar portion to cover said abutted first and second end edges with said shoulder means and said rim being juxtaposed;

at least one reinforcing rib attaching each of said first and second members to said collar inner surface at a location spaced from said member one end; and the first and second members of said and second fastening means being positioned on said collar portions to bias said fastening means into locking engagement when said collar portions are interlocked.

9. A seal for providing an indication of tampering with a connection nut enclosed thereby comprising:

first and second separate, unconnected, interlockable collar portions for forming a collar for surrounding a connection nut, each of said first and second collar portions including an outer wall having an inner and an outer surface, first and second walls formed integrally with said outer wall and extending in substantially parallel spaced relationship therefrom, said first and second walls extending substantially normal to said outer wall and each terminating at an inner edge, the inner edges of the first and second walls of said first collar portion cooperating with the inner edges of the first and second walls respectively of said second collar portion to define enclosed openings in said collar when said first and second collar portions are interlocked, said outer wall and first and second walls terminating at first and second spaced end edges, said first end edge being in a plane which is spaced outwardly beyond the plane of said second end edge, the first end edge of each of said first and second collar portions abutting the second end edge of the other collar portion when the first and second collar portions are interlocked, a cuff located adjacent the second end edge and being formed integrally with said outer and first and second walls to extend completely around and outwardly of said second end edge, said cuff extending from said outer and first and second walls beyond said second end edge for a distance which is at least equal to the distance between the planes of said first and second end edges so that the cuff will extend over the abutting first and second end edges of said first and second collar portions when the first and second collar portions are interlocked, and first and second spaced fastening means on each of said first and second collar portions with the first fastening means of each collar portion being adapted to engage and interlock with the second fastening means of the remaining collar portion at a location spaced inwardly from the first and second walls and the inner surface of the outer walls of said first and second collar portions to form said collar, said first fastening means including a first member affixed at a base end thereof to the inner surface of said outer wall at a location spaced from but adjacent to said first end edge, said first member having a free end opposite to said base end thereof which is spaced inwardly from the inner surface of said outer wall and which extends to and terminates at a terminal edge spaced outwardly beyond the plane of said first end edge, the free end of said first member being provided with a first catch means on the portion thereof which extends outwardly beyond the plane of said first end edge, and said second fastening means including a second member affixed at a base end thereof to the inner surface of said outer wall at a location spaced from but adjacent to said second end edge, said second member having a free end opposite to said base end thereof which is spaced inwardly from the inner surface of said outer wall and which extends to and terminates at a terminal edge spaced outwardly beyond the plane of said second end edge but positioned within the confines of said cuff, the free end of said second member being provided with a second catch means for engaging and interlocking with the first catch means of an adjoining collar portion when said first and second collar portions are interlocked, the free end of one of said first and second members being spaced from the inner surface of said outer wall a greater distance than the free end of the remaining member, said first and second members and said first and second catch means being located and formed so that said first catch means of a first of said collar portions will engage the second catch means of a second said collar portions during but prior to the interlocking thereof to cause relative flexure between the free ends of said first and second members, said first fastening means including a single reinforcing rib extending between the inner surface of said outer wall and said first member, said single reinforcing rib being secured to said first member substantially below said first end edge, said second fastening means including at least two spaced reinforcing ribs extending between the inner surface of said outer wall and said second member.

10. The seal of claim 9 wherein said first member includes an outer face located adjacent to the inner surface of said outer wall and an inner face opposite to said to outer face, said first catch means including a ledge forming leg extending outwardly from said inner face at a location spaced from the terminal edge of the free end of said first member and an inclined ramp positioned between said ledge forming leg and the terminal edge of the free end of said first member, said inclined ramp being formed to angle outwardly away from said terminal edge toward said ledge forming leg, the free end of said second member being spaced from the inner surface of said outer wall and from said cuff for a distance sufficient to permit the free end of said first member and said first catch to be inserted therebetween when said first and second collar portions are interlocked.

11. The seal of claim 10 wherein said second catch means includes receiving means formed in said second member in spaced relationship to the terminal edge thereof to receive the ledge forming leg of said first catch means, and a receiver inclined ramp positioned between said receiving means and the terminal edge of said second member, said receiver inclined ramp being formed to angle outwardly away from the terminal edge of said second member toward said receiving means, said first and second members being positioned so that the inclined ramp of said first catch means contacts the receiver inclined ramp of a second collar portion during the interlocking of first and second collar portions, said first and second members and the inclined ramp and receiver inclined ramp of said first and second catch means respectively being formed to cause one of said first and second members to flex with respect to the other member during the interlocking of said first and second collar portions.

12. The seal of claim 11 wherein said second member has a width greater than that of said first member, said receiving means including a slot formed in said second member and extending in substantially parallel spaced relationship to the terminal edge thereof, said two reinforcing ribs extending between the inner surface of said outer wall and said second member being spaced to engage said second member on opposite sides of said slot.

13. The seal of claim 12 wherein said first and second walls each terminate at an arcuate inner edge, the diameter of the inner edge of one of said first and second walls being greater than the diameter of the inner edge of the remaining wall of said first and second walls, said second fastening means including a central reinforcing rib extending between the inner surface of said outer wall and said second member, said central reinforcing rib being located centrally of said second member below said slot.

14. The seal of claim 13 wherein said slot includes an upper edge extending substantially parallel to the terminal edge of said second member and a lower edge spaced from said upper edge and being positioned at a greater distance from the terminal edge of said second member than is said upper edge, said two spaced reinforcing ribs on opposite sides of said slot each engaging said second member between the lower edge of said slot and the terminal edge of said second member, said two spaced reinforcing ribs being spaced apart for a distance greater than the width of said first member.

15. The seal of claim 12 wherein said slot includes an upper edge extending substantially parallel to the terminal edge of said second member and a lower edge spaced from said upper edge and being positioned at a greater distance from the terminal edge of said second member than is said upper edge, said second fastening means including a third reinforcing rib extending between the inner surface of said outer wall and said second member, said third reinforcing rib being positioned between the two reinforcing ribs on opposite sides of said slot and terminating in spaced relationship to the lower edge of said slot at a point between said lower edge of said slot and the base end of said second member.

16. The seal of claim 15 wherein each of said two reinforcing ribs on opposite sides of said slot extend outwardly at an angle from a point on the inner surface of said outer wall adjacent said second end edge to a point on said second member between the upper edge of said slot and the terminal edge of said second member.

17. The seal of claim 9 wherein said first catch means is positioned on said first member outwardly of said first end surface thereof and the confines of said collar portion.

18. The seal of claims 9, 10, 17, 11, 12, 13, 15, 16 or 14 wherein the first and second members of said first and second fastening means are positioned on said collar portions to bias said fastening means into locking engagement when said collar portions are interlocked.

* * * * *